Sept. 8, 1942.  L. W. WELCH  2,295,146
REGISTER ASSEMBLY
Filed Oct. 28, 1940   3 Sheets-Sheet 1
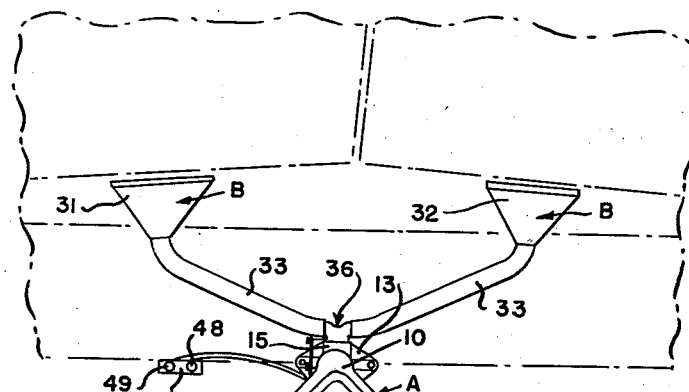
FIG.1.
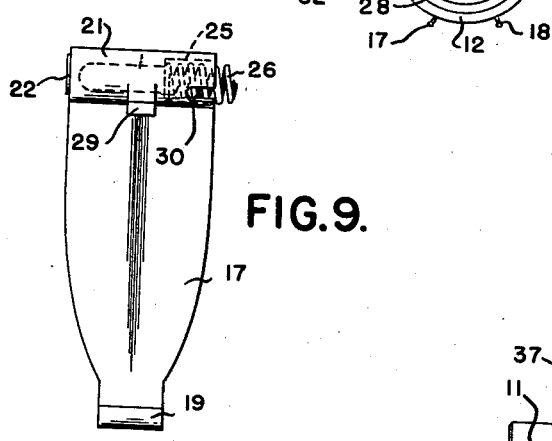
FIG.9.
FIG.10.
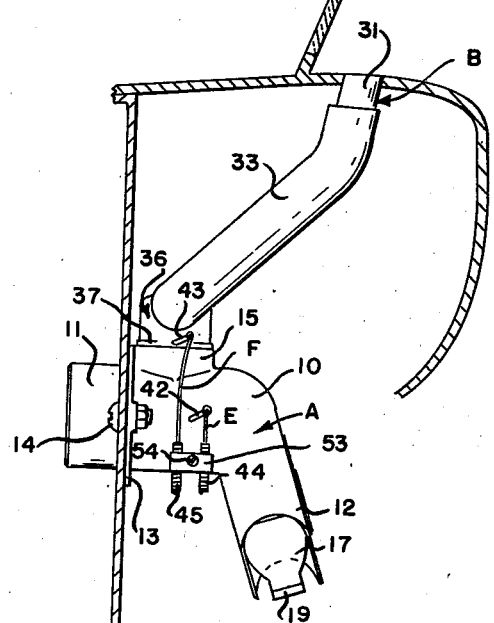
FIG.2.
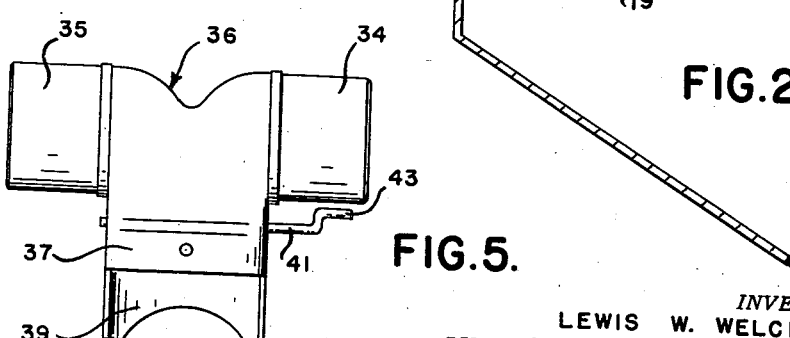
FIG.5.
INVENTOR.
LEWIS W. WELCH
BY
ATTORNEYS Sept. 8, 1942.  L. W. WELCH  2,295,146
REGISTER ASSEMBLY
Filed Oct. 28, 1940  3 Sheets-Sheet 2
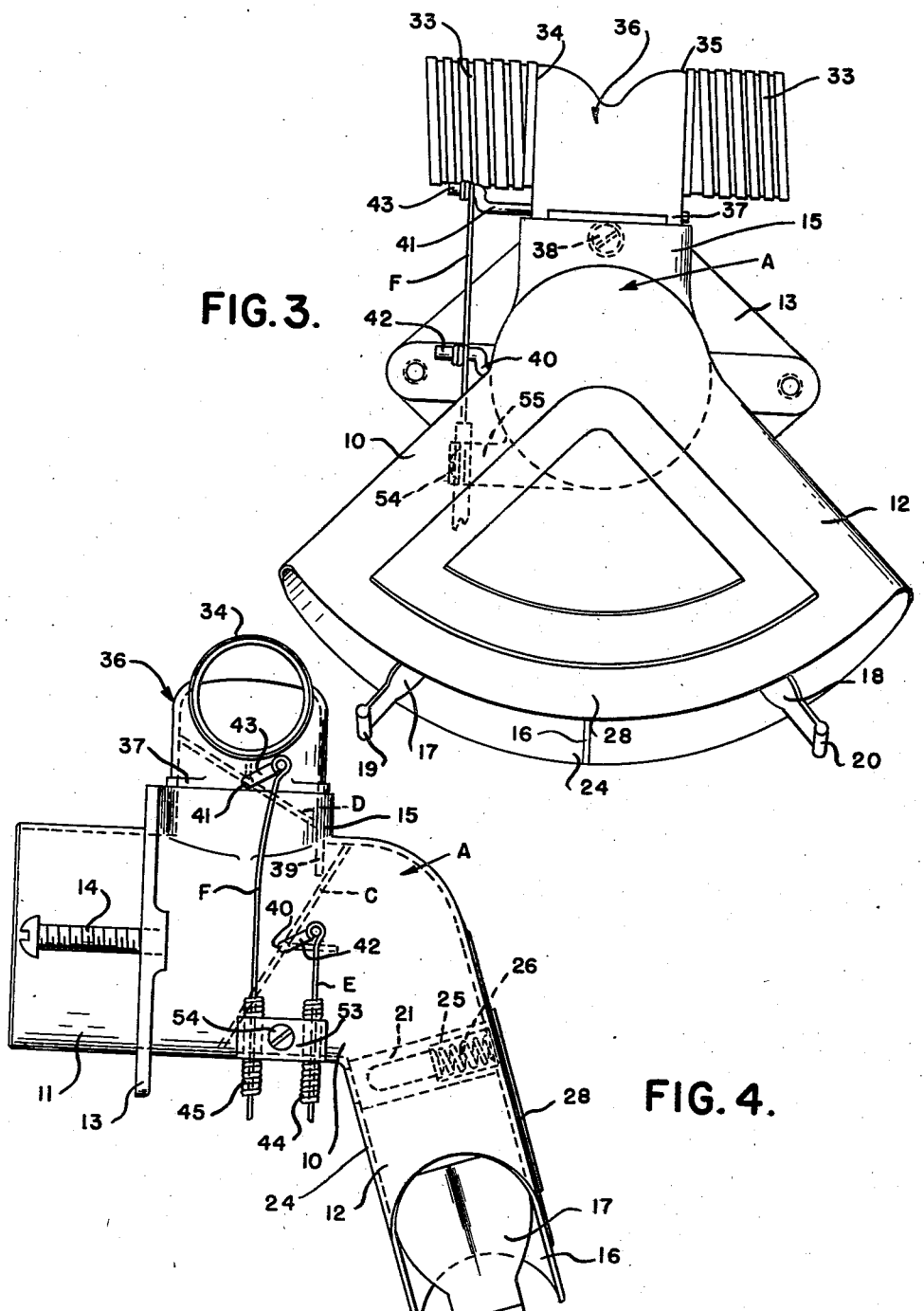
INVENTOR.
LEWIS W. WELCH
BY
ATTORNEYS Sept. 8, 1942.  L. W. WELCH  2,295,146
REGISTER ASSEMBLY
Filed Oct. 28, 1940   3 Sheets-Sheet 3

INVENTOR.
LEWIS W. WELCH
BY
ATTORNEYS

Patented Sept. 8, 1942

2,295,146

UNITED STATES PATENT OFFICE 2,295,146

REGISTER ASSEMBLY

Lewis W. Welch, Detroit, Mich., assignor to Novi Equipment Company, Novi, Mich., a corporation of Michigan Application October 28, 1940, Serial No. 363,226

6 Claims. (Cl. 98—2)

This invention relates generally to warm air register and windshield defroster combinations of heating apparatus for motor vehicles.

One of the essential objects of the invention is to provide a combination of this type wherein means independent of the valves for controlling the passage of warm air through the structure is provided for intercepting and directing to the defroster some of the warm air supplied to the register.

Another object is to provide a structure wherein the controls for the valves include wires connected directly to the crank portions of the shafts for said valves and movable lengthwise in cables clamped to one side of the body of the register. Thus, special supporting brackets for such controls are unnecessary and have been dispensed with entirely.

Another object is to provide a structure wherein the air outlet for the register has a central partition and is provided upon opposite sides of said partition with indvidually operable doors or deflectors which when opened serve to direct angularly to the right and left of the partition the air discharged.

Another object is to provide each of said doors with an improved mounting which includes a coil spring for holding the door in any adjusted position.

Another object is to simplify the construction, reduce manufacturing costs, and render more efficient structures of the type mentioned.

Other objects, advantages and novel details of construction of this invention will be made more apparent as this description proceeds, especially when considered in connection with the accompanying drawings, wherein:

Figure 1 is a perspective view of a combination embodying my invention and showing by dot and dash lines a portion of the interior of a vehicle body to which this combination may be applied.

Figure 2 is a side elevation of the structure shown in Figure 1;

Figure 3 is a top plan view of the register and associated parts of the combination;

Figure 4 is a side elevation of the structure illustrated in Figure 3;

Figure 5 is a detail view of the T-fitting and showing the valve therein;

Figure 9 is a detail view of one of the doors in the outlet portion of the register;

Figure 10 is a vertical sectional view through the pivot end of one of the doors illustrated in Figure 9.

Figure 6:
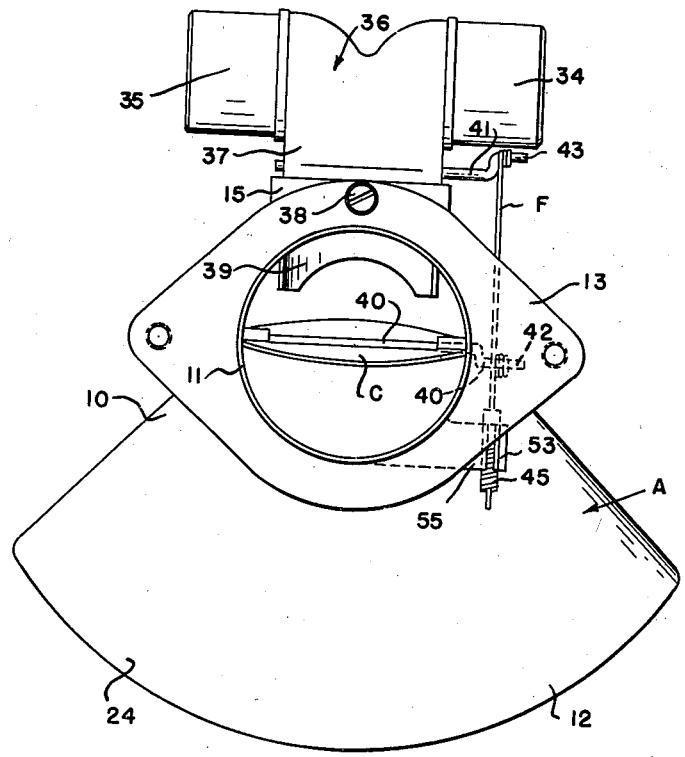
Figure 6 is an end view of the inlet portion of the register.
Figure 8:
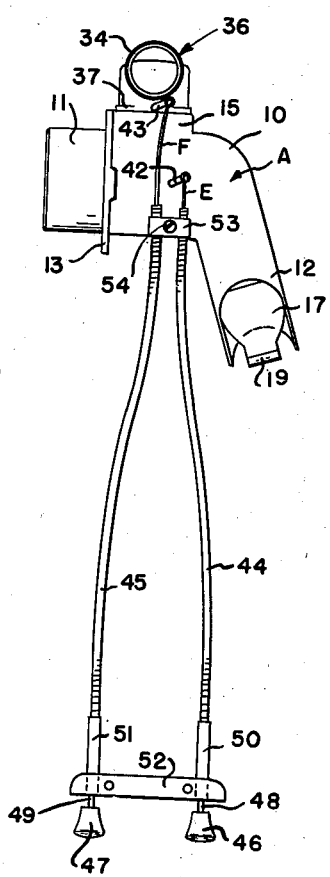
Figure 8 is a detail view of the valve control means.
Figure 7:
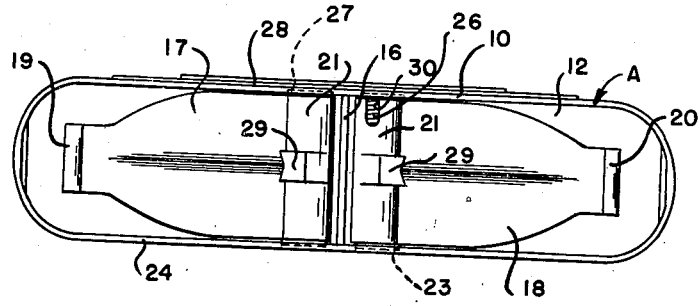
Figure 7 is an end view of the outlet portion of the register.

Referring now to the drawings, A is the register, B is the defroster for the vehicle windshield, C and D, respectively, are valves for regulating the passage of air through the register and defroster, and E and F, respectively, are manually operable controls for said valves.

As shown, the register A has a substantially L-shaped body 10 provided with a tubular inlet portion 11 and a fan-shaped outlet portion 12. Any suitable hose or tubing (not shown) may be telescopically engaged with the tubular inlet portion 11 for conducting thereto warm air from a suitable heater. Located upon the outside of the tubular inlet portion 11 adjacent its forward end is a laterally projecting attaching flange 13 which may be fastened by suitable bolts 14 to the dashboard or other suitable part of the vehicle body, while immediately in rear of this flange is a laterally projecting tubular outlet 15 for warm air to the defroster B. Within the tubular inlet portion 11, preferably in rear of the tubular outlet 15, is the valve C for regulating the passage of warm air to the outlet portion 12. At the center of the fan-shaped outlet 12 is a partition 16 that extends from a point adjacent the juncture of said outlet portion with the tubular inlet portion to a point adjacent the forward edge of the outlet portion. Upon opposite sides of this partition 16 are individually operable doors or deflectors 17 and 18 that are pivoted at their inner ends adjacent the inner end of the partition 16 and project outward beyond the forward edge of the outlet portion 12. Preferably these doors 17 and 18 are provided at their forward ends with finger pieces 19 and 20 by which they may be manipulated.

In the present instance the doors 17 and 18 are alike and each comprises an elongated plate-like member provided at its rear end with a cylindrical portion 21. At the lower end of each cylindrical portion 21 is a shallow circular portion 22 that constitutes a pintle or pivot pin and engages a circular hole 23 in the bottom wall 24 of the fan-shaped outlet 12. The upper end of the cylindrical portion 21 has a socket 25 receiving a coil spring 26 that also serves as a pintle and engages a circular recess 27 in the top wall 28 of the outlet. Projecting forwardly from each cylindrical portion 21 and integral with opposite sides of each plate-like door are suitable lugs or projections 29. Thus, regardless of which door is upon the right or left side of the partition 16, there is a lug 29 engageable with such partition to limit pivotal or swinging movement of the doors. To expedite insertion of the doors into or removal thereof from the outlet 12, the hollow upper ends 25 of the cylindrical portions are slotted at 30 to receive a suitable tool or instrument (not shown) for compressive engagement with the springs 26.

The defroster B for the vehicle windshield preferably comprises two substantially fan-shaped heads 31 and 32 adapted to be located upon the inner side of the windshield at the base thereof so as to discharge the warm air upwardly toward the glass of the windshield. Connected to these heads 31 and 32 are supply conduits or hose 33 that lead from aligned tubular portions 34 and 35 of a T-fitting 36 connected to the tubular outlet 15 at one side of the register body. Preferably the fitting 36 is a one-piece casting and contains the valve D for regulating the passage of warm air through the hose 33 to the heads 31 and 32. The tubular central portion 37 of the fitting fits within the tubular outlet 15 of the register and is held in place by a set screw 38.

To be sure that warm air from the inlet portion 11 of the register will be intercepted and directed to the defroster B regardless of the position of the valve C of the register, I have provided the inner end of the T-fitting 36 with a scoop-like extension 39 that projects within the tubular inlet portion 11 in advance of the valve C for catching and directing to the interior of the fitting warm air supplied to the register.

The valves C and D are preferably the butterfly type and are rigid with shafts 40 and 41 respectively journaled in the tubular portions 11 and 37 respectively of the register and fitting. The valve C is adapted to close the rear end of the tubular portion 11 of the register and thus shut off the supply of air to the outlet portion 12, while the valve D is adapted to close the tubular portion 37 of the fitting and cut off the supply of air to the windshield defroster heads 31 and 32. The shafts 40 and 41 have crank portions 42 and 43 at their outer ends which are connected directly to the manually operable controls E and F.

In the present instance the controls E and F are in the form of wires slidable in flexible cables 44 and 45 and actuable by finger pieces 46 and 47. Preferably the forward ends of the wires are coiled upon the crank arms 42 and 43, respectively, of the shafts, while the rear ends of the wires are rigid with relatively short rods 48 and 49 that are slidable in tubes 50 and 51 rigid with an attaching plate 52 and are fixed to and serve as shanks for the finger pieces 46 and 47. The flexible cables 44 and 45 for the wires are rigid with the tubes 50 and 51 and terminate short of the coiled ends of the wires. Preferably the cables 44 and 45 are clamped by a plate 53 and screw 54 against a lug 55 projecting from one side of the tubular portion 11 of the register, hence special or additional supporting brackets are unnecessary.

In use, the valves C and D may be operated independently of each other as desired to regulate the passage of warm air to the outlet portion 12 of the register and to the windshield defroster heads 31 and 32. Merely pulling out or pushing in the finger pieces 46 and 47 accomplishes the desired results. When both valves are opened, the warm air may flow to both the outlet portion 12 of the register and to the defroster heads 31 and 32. Due to the scoop-like extension 39 of the fitting warm air will be directed toward the valve D regardless of whether the valve C is open or closed. Manipulation of the doors 17 and 18 will control the direction of the air discharged from the outlet portion 12 of the register.

What I claim as my invention is:

1. An air register having a hollow fan shaped outlet portion for air provided with inner and outer ends, said outlet portion being provided at its inner end with a tubular inlet opening for air and provided at its outer end with a relatively wide and shallow outlet opening for air, said outlet portion having upright side walls diverging outwardly from the inlet opening to the outlet opening and having substantially parallel top and bottom walls, an upright plate like partition within and extending lengthwise of said outlet portion throughout substantially its entire length at approximately the center thereof, said partition being rigid with said parallel top and bottom walls, individually operable deflector doors within and extending longitudinally of said outlet portion upon opposite sides of said partition, the inner ends of said longitudinally extending doors being adjacent the inner end of the partition, and pivots for said doors engaging the parallel top and bottom walls of said outlet portion, the outer ends of said doors projecting outwardly beyond the outlet opening and having fingerpieces by which they may be individually manipulated.

2. An air register having a hollow fan shaped outlet portion for air provided with inner and outer ends, said outlet portion being provided at its inner end with a tubular inlet opening for air and provided at its outer end with a relatively wide and shallow outlet opening for air, said outlet portion having upright side walls diverging outwardly from the inlet opening to the outlet opening and having substantially parallel top and bottom walls, an upright plate like partition within and extending lengthwise of said outlet portion throughout substantially its entire length at approximately the center thereof and rigid with said parallel top and bottom walls, said top and bottom walls having vertically aligned circular recesses therein upon opposite sides and adjacent the inner end of said partition, individually operable elongated plate like deflector doors within and extending longitudinally of said outlet portion upon opposite sides of said partition, the inner ends of each longitudinally extending door being adjacent the inner end of the partition and provided with an upright cylindrical portion, the lower end of each cylindrical portion having a circular portion constituting a pintle or pivot pin engaging one of the recesses in the bottom wall of the outlet portion, the upper end of each cylindrical portion having an upwardly opening socket, and a coil spring constituting a pintle or pivot pin extending between and having opposite ends thereof disposed in the socket and one of the recesses in the top wall of the outlet portion.

3. An air register having a hollow fan shaped outlet portion for air provided with inner and outer ends, said outlet portion being provided at its inner end with a tubular inlet opening for air and provided at its outer end with a relatively wide and shallow outlet opening for air, said outlet portion having upright side walls diverging outwardly from the inlet opening to the outlet opening and having substantially parallel top and bottom walls, an upright plate like partition within and extending lengthwise of said outlet portion throughout substantially its entire length at approximately the center thereof and rigid with said parallel top and bottom walls, said top and bottom walls having vertically aligned circular recesses therein upon opposite sides and adjacent the inner end of said partition, individually operable elongated plate like deflector doors within and extending longitudinally of said outlet portion upon opposite sides of said partition, the inner end of each longitudinally extending door being adjacent the inner end of the partition and provided with an upright cylindrical portion, the lower end of each cylindrical portion having a circular portion constituting a pintle or pivot pin engaging one of the recesses in the bottom wall of the outlet portion, the upper end of each cylindrical portion having an upwardly opening socket, and a coil spring constituting a pintle or pivot pin extending between and having opposite ends thereof disposed in the socket and one of the recesses in the top wall of the outlet portion, each socket being slotted for the reception of a tool for compressive engagement with the spring therein to permit removal of the door from the outlet portion.

4. An air register having a hollow fan shaped outlet portion for air provided with inner and outer ends, said outlet portion being provided at its inner end with a tubular inlet opening for air and provided at its outer end with a relatively wide and shallow outlet opening for air, said outlet portion having upright side walls diverging outwardly from the inlet opening to the outlet opening and having substantially parallel top and bottom walls, an upright plate like partition within and extending lengthwise of said outlet portion throughout substantially its entire length at approximately the center thereof and rigid with said parallel top and bottom walls, individually operable elongated plate like deflector doors within and extending longitudinally of said outlet portion upon opposite sides of said partition, the inner ends of said longitudinally extending doors being adjacent the inner end of the partition and pivotally connected to the parallel top and bottom walls of said outlet portion.

5. An air register having an elongated hollow body provided at one end thereof with an inlet opening for air and provided at the other end thereof with an outlet opening for air, said elongated body being provided at one side thereof intermediate the inlet and outlet openings aforesaid with a laterally projecting tubular outlet portion for air, a T fitting having the stem of the T sleeved within the tubular outlet portion and secured thereto, said stem having a scoop like extension at its inner end disposed within and projecting part way across the interior of the elongated body to intercept and direct into the stem of the T fitting a part of the air flowing through the body from the inlet opening to the outlet opening thereof, and means within the elongated body and fitting for controlling the passage of air therethrough.

6. An air register having an elongated hollow body provided at one end thereof with an inlet opening for air and provided at the other end thereof with an outlet opening for air, said elongated body being provided at one side thereof intermediate the inlet and outlet openings aforesaid with a laterally projecting tubular outlet portion for air, a T fitting having the stem of the T sleeved within the tubular outlet portion and secured thereto, said stem having a scoop like extension at its inner end disposed within and projecting part way across the interior of the elongated body to intercept and direct into the stem of the T fitting a part of the air flowing through the body from the inlet opening to the outlet opening thereof, and means within the elongated body between the outlet opening thereof and the scoop like extension of the T fitting to cut off the passage of air from the inlet opening to the outlet opening of the body and at the same time to co-operate with the scoop like extension of the T fitting to direct air from the body into the stem of the T fitting, including a butterfly valve pivotally mounted within the body and engageable with said scoop like extension.

LEWIS W. WELCH.